US009066234B2

(12) United States Patent
Karlson et al.

(10) Patent No.: US 9,066,234 B2
(45) Date of Patent: *Jun. 23, 2015

(54) OWNER PRIVACY IN A SHARED MOBILE DEVICE

(71) Applicant: MICROSOFT TECHNOLOGY LICENSING, LLC, Redmond, WA (US)

(72) Inventors: Amy Karlson, Bellevue, WA (US); Alice Jane Bernheim Brush, Seattle, WA (US); Stuart Schechter, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/875,139

(22) Filed: May 1, 2013

(65) Prior Publication Data

US 2013/0247224 A1 Sep. 19, 2013

Related U.S. Application Data

(63) Continuation of application No. 12/194,213, filed on Aug. 19, 2008, now Pat. No. 8,549,657.

(60) Provisional application No. 61/052,455, filed on May 12, 2008.

(51) Int. Cl.
*H04W 12/08* (2009.01)
*G06F 21/62* (2013.01)
(Continued)

(52) U.S. Cl.
CPC .............. *H04W 12/08* (2013.01); *G06F 21/62* (2013.01); *G06F 2221/2149* (2013.01);
(Continued)

(58) Field of Classification Search
CPC ................. H04L 29/0685; H04L 29/06823; H04L 63/102; H04L 67/306; H04W 12/08; H04W 4/206; H04W 88/02; H04M 1/72563; H04M 1/67
USPC ................................................... 726/28, 1, 2
See application file for complete search history.

(56) References Cited

U.S. PATENT DOCUMENTS 6,286,001 B1    9/2001   Walker et al.
6,339,826 B2    1/2002   Hayes, Jr. et al.
(Continued)

FOREIGN PATENT DOCUMENTS

CN       1984402       6/2007
CN     101112072       1/2008
(Continued)

OTHER PUBLICATIONS

The Chinese Office Action mailed May 6, 2013 for Chinese patent application No. 200980128048.8, a counterpart foreign application of U.S. Appl. No. 12/194,213, 7 pages.
(Continued)

*Primary Examiner* — Jung Kim
*Assistant Examiner* — Thomas Ho
(74) *Attorney, Agent, or Firm* — Julie Kane Akhter; Sade Fashokun; Micky Minhas

(57) ABSTRACT

Systems and methods that regulate range of access to personal information of a mobile unit's owner. The access control component can designate granularity for access levels and/or a spectrum of access modes—(as opposed to a binary choice of full access or no access at all). Such access can be based on a spectrum and/or discrete trust relationship between the owner and user of the mobile unit. A profile definition component can exploit an owner's trust relationships to designate levels of security. The profile definition component can further define a profile based on a set of applications, such as entertainment mode, browser mode, and the like.

20 Claims, 11 Drawing Sheets

(51) Int. Cl.

| | |
|---|---|
| *H04L 29/06* | (2006.01) |
| *H04W 4/20* | (2009.01) |
| *H04M 1/67* | (2006.01) |
| *H04M 1/725* | (2006.01) |
| *H04W 88/02* | (2009.01) |
| *H04L 29/08* | (2006.01) |

(52) U.S. Cl.
CPC ............ *H04L 63/102* (2013.01); *H04M 1/67* (2013.01); *H04M 1/72563* (2013.01); *H04W 4/206* (2013.01); *H04W 88/02* (2013.01); *H04L 67/306* (2013.01)

(56) References Cited

U.S. PATENT DOCUMENTS

| | | | |
|---|---|---|---|
| 6,405,033 | B1 | 6/2002 | Kennedy, III et al. |
| 6,504,480 | B1 | 1/2003 | Magnuson et al. |
| 6,546,002 | B1 | 4/2003 | Kim |
| 6,549,768 | B1 | 4/2003 | Fraccaroli |
| 6,920,455 | B1 | 7/2005 | Weschler |
| 6,941,134 | B2 | 9/2005 | White |
| 7,058,659 | B2 | 6/2006 | Ryu |
| 7,076,797 | B2 | 7/2006 | Loveland |
| 7,142,848 | B2 | 11/2006 | Owen et al. |
| 7,171,557 | B2 | 1/2007 | Kallahalla et al. |
| 7,212,613 | B2 | 5/2007 | Kim et al. |
| 7,222,360 | B1 | 5/2007 | Miller |
| 7,272,388 | B2 | 9/2007 | Andrew et al. |
| 7,274,925 | B2 | 9/2007 | Chaar et al. |
| 7,346,921 | B2 | 3/2008 | Murren et al. |
| 7,366,798 | B2 | 4/2008 | Nordstrom et al. |
| 7,408,506 | B2 | 8/2008 | Miller |
| 7,634,455 | B1* | 12/2009 | Keene et al. ............... 1/1 |
| 7,958,562 | B2 | 6/2011 | Gaucas |
| 2001/0039587 | A1* | 11/2001 | Uhler et al. ............. 709/229 |
| 2002/0044149 | A1 | 4/2002 | McCarthy et al. |
| 2003/0139192 | A1 | 7/2003 | Chmaytelli et al. |
| 2003/0187803 | A1* | 10/2003 | Pitt .......................... 705/64 |
| 2004/0039909 | A1 | 2/2004 | Cheng |
| 2005/0107114 | A1* | 5/2005 | Ocock ................... 455/550.1 |
| 2005/0138110 | A1 | 6/2005 | Redlich et al. |
| 2005/0143171 | A1 | 6/2005 | Loose |
| 2006/0246872 | A1 | 11/2006 | Tarkkala |
| 2007/0006327 | A1* | 1/2007 | Lal et al. ................... 726/31 |
| 2007/0028176 | A1 | 2/2007 | Perdomo et al. |
| 2007/0072616 | A1 | 3/2007 | Irani |
| 2007/0111726 | A1* | 5/2007 | Lambert et al. ......... 455/432.1 |
| 2007/0180509 | A1 | 8/2007 | Swartz et al. |
| 2008/0051079 | A1* | 2/2008 | Forsgren .................. 455/425 |
| 2008/0080688 | A1 | 4/2008 | Burgan et al. |
| 2008/0082693 | A1 | 4/2008 | Meijer et al. |
| 2008/0101658 | A1 | 5/2008 | Ahern et al. |
| 2009/0089886 | A1 | 4/2009 | Cheng et al. |
| 2009/0116703 | A1 | 5/2009 | Schultz |
| 2009/0157560 | A1 | 6/2009 | Carter et al. |
| 2009/0158389 | A1 | 6/2009 | Waltenberg et al. |
| 2009/0282473 | A1 | 11/2009 | Karlson et al. |
| 2010/0066821 | A1 | 3/2010 | Rosener et al. |
| 2010/0115610 | A1 | 5/2010 | Tredoux et al. |
| 2010/0134310 | A1 | 6/2010 | Zheng et al. |
| 2010/0216509 | A1 | 8/2010 | Riemer et al. |
| 2010/0306832 | A1 | 12/2010 | Mu et al. |
| 2010/0311336 | A1 | 12/2010 | Huotari et al. |
| 2010/0321155 | A1 | 12/2010 | Ballard |
| 2011/0167344 | A1 | 7/2011 | Pan |
| 2011/0247045 | A1 | 10/2011 | Rajagopal et al. |
| 2011/0275321 | A1 | 11/2011 | Zhou et al. |
| 2012/0046020 | A1 | 2/2012 | Tomasini |
| 2012/0084737 | A1 | 4/2012 | Gimpl et al. |
| 2012/0098768 | A1 | 4/2012 | Bendewald et al. |
| 2012/0100895 | A1 | 4/2012 | Priyantha et al. |
| 2012/0144468 | A1 | 6/2012 | Pratt et al. |

FOREIGN PATENT DOCUMENTS

| | | |
|---|---|---|
| JP | 07203015 A | 4/1995 |
| JP | 2003032353 A | 1/2003 |
| KR | 20050037613 | 4/2005 |
| WO | WO2007130123 | 11/2007 |

OTHER PUBLICATIONS

U.S. Appl. No. 13/726,095, filed Dec. 22, 2012, King, et al., "Mobile Device Child Share".

U.S. Appl. No. 13/726,099, filed Dec. 22, 2012, King, et al., "Restricted Execution Modes".

Aventail and Trust Digital Launch Integrated Secure Mobile Access Solution. Retrieved from http://findarticles.com/p.articles/mi__pwwi/is__200602/ai__n16063742. Last accessed May 14, 2008.

Campbell et al, "Biometrically Enhanced Software Defined Radios", Proc. Software Defined Radio Technical Cont, Orlando, Florida, Nov. 2003, 6 pgs.

The Chinese Office Action mailed Dec. 19, 2012 for Chinese patent application No. 200980128048.8, a counterpart foreign application of U.S. Appl. No. 12/194,213, 9 pages.

Covington et al, "Parameterized Authentication", Proc. 9th European Symposium on Research Computer Security, Lecture Notes in Computer Science, Sep. 2004, 18 pgs.

The European Search Report mailed Jan. 17, 2013 for European patent application No. 09747072.8, 5 pages.

Hoffman, et al., "Multilateral Security in Mobile Applications and Location Based Services", Retrieved from http://www.igd.fhg.de/~jpeters/publications/peters2002a.pdf. Last accessed May 14, 2008.

"iPad Parental Control (restricting app access)", iPad Reviews, Jailbreak Guides, Retrieved on: Oct. 13, 2011, Available at: http://ipaded.net/ipad/parental-control/, 5 pgs.

Jagadeesan et al, "A Novel Approach to Design of User Re-Authentication Systems", Proc 3rd IEEE Intl Conf on Biometrics: Theory, Applications and Systems, Sep. 2009, 6 pgs.

Klosterman et al, "Secure Continuous Biometric Enhanced Authentication", Technical Report, May 2000, 25 pgs.

Kottahachchi, et al., "Access Controls for Intelligent Environments", Retrieved from http://people.csail.mit.edu/buddhika/publications/academics/ISDA04-AccessManager.pdf. Last accessed May 14, 2008.

McGlaun, "Fixes for Distracted Driving Remain Unclear", retrieved at <<http://www.dailytech.com/Fixes+for +Distracted+Driving+Remain+Unclear>>, DailyTech, LLC, published Jun. 12, 2012, 2 pages.

"No Tech Panacea for Tech-Distracted Driving", retrieved at <<http://mobile.slashdotorg/story/12/06/11/0556231/no-tech-panacea-for . . . >>, Slashdot, Dec. 6, 2011, 30 pages.

Office Action for U.S. Appl. No. 13/222,538, mailed on Feb. 14, 2013, Karin Struass, "Progressive Authentication", 33 pages.

Final Office Action for U.S. Appl. No. 12/194,213, mailed on Sep. 20, 2011, Amy Kathleen Karlson, "Owner Privacy in a Shared Mobile Device", 11 pages.

PCT Intl Search Report and Written Opinion for Application No. PCT/US2009/039509, dated Nov 18, 2009, 11 pgs.

Quick, "BizzTrust for Android Splits a Single Smartphone into Two Virtual Phones", Oct. 2011, retrieved Jan. 10, 2012 from http://www.gizmag.com/bizztrust-for-android/20114, 3 pgs.

Digitalquest Tech News, Software Reviews, Tips and Tricks, "Restrict Access to Applications using AppLocker", Retrieved on: Oct. 13, 2011, Available at: http://www.dq.winsila.com/tips-tricks/restrict-access-to-applications-using-applocker.html, 3 pgs.

"Setting up Simple Restricted Access", Retrieved on: Oct. 13, 2011, Available at: http://support.webvanta.com/article/99486-setting-up-simple-restricted-access, 3 pgs.

Simonite, "One Smart Phone, Two Personalities", Oct. 2011, retrieved Jan. 10, 2012 from http://www.technologyreview.com/communications/38865, 3 pgs.

Stajano, "One user, many hats; and, sometimes, no hat—towards a secure yet usable PDA", Security Protocols Workshop, Springer, Verlag. 2004, pp. 51-64.

(56) References Cited

OTHER PUBLICATIONS

Talbot, "App Battles Driver Distraction but Spares Passengers", Technology Review, India, Published by MIT, Feb. 14, 2012, 2 pages.
Temporale, "Removing Application Lock on Windows Mobile Standard Devices", Retrieved on: Oct. 13, 2011, Available at: http://www.mobilejaw.com/articles/2009/09/removing-application-lock-on-windows-mobile-standard-devices/, Sep. 2009, 13 pgs.
Weilenmann, et al., "Local use and sharing of mobile phones" In B. Brown, N. Green and R. Harper (Eds). Wireless World: Social and Interactional Aspects of the Mobile Age, Springer Verlag, 2001, pp. 99-115.

The Chinese Office Action mailed Dec. 2, 2013 for Chinese patent application No. 200980128048.8, a counterpart foreign application of US patent No. 8,549,657, 6 pages.
Office action for U.S. Appl. No. 13/328,312, mailed on Aug. 6, 2013, Schechter, et al, "Device Locking with Hierarchical Activity Preservation", 18 pages.
Office action for U.S. Appl. No. 13/222,538 mailed on Oct. 11, 2013, Strauss, et al., "Progressive Authentication", 38 pages.
Office action for U.S. Appl. No. 13/222,538 mailed on May 28, 2013, Strauss, et al., "Progressive Authentication", 43 pages.

* cited by examiner

US 9,066,234 B2

OWNER PRIVACY IN A SHARED MOBILE DEVICE

CROSS REFERENCE TO RELATED APPLICATION

This application is a continuation of commonly owned U.S. patent application Ser. No. 12/194,213, filed Aug. 19, 2008, entitled "OWNER PRIVACY IN A SHARED MOBILE DEVICE," which application is based on and claims the benefit of U.S. Provisional Application Ser. No. 61/052,455 entitled "OWNER PRIVACY IN A SHARED MOBILE DEVICE", filed on 12 May 2008, the entirety of which is herein incorporated by reference.

BACKGROUND

Increasing advances in computer technology (e.g., microprocessor speed, memory capacity, data transfer bandwidth, software functionality, and the like) have generally contributed to enhanced computer application in various industries. Moreover, wireless mobile technology has become widespread and is utilized for both personal as well as business uses. Mobile devices such as telephones, pagers, personal digital assistants (PDAs), data terminals, and the like, are designed to be carried by those who travel from place to place in the daily course of business, for personal reasons, or for both business and personal reasons.

For example, mobile electronic organizer devices are being widely used to manage and classify a variety of data. A mobile electronic organizer typically enables a user to electronically retain personal data for any purpose and to retrieve the data as desired. Even though Personal Information Managers (PIMs) vary widely with respect to appearances, common to all of such devices is the ability to provide methods for managing and organizing personal information and to readily supply the information to the user. Moreover, in accordance with a common PIM, a user can search contact entries alphabetically by name, by keyword, and appointments by date, topic, and the like. Essentially, once personal data is entered into a PIM, the user can query data and retrieve information according to a plurality of specified criteria.

The appeal of mobile devices is due in large part to the convenience of having such devices available regardless of where the user may be located (e.g., at home, at work, traveling, out of town, and the like). Such computing devices can be accessed at almost any time and place and can contain a tremendous amount of information relating to people, organizations, general interests, and the like.

Moreover, electronic storage mechanisms have enabled accumulation of massive amounts of data. For instance, data that previously required volumes of books for recordation can now be stored electronically without the expense of printing paper and with a fraction of the physical space needed for storage of paper. Mobile devices can thus include multiple functions such as cellular phone service, voice over Internet protocol ("VoIP") phone service, software applications, email access, Internet capabilities, calendar functions, music players and the like. Functions, features and capabilities have increased both the utility and complexity of mobile devices. It is likely that functions will continue to be added to mobile devices further increasing both usefulness and intricacy.

As such, mobile phones today exemplify personal computing. Their rapid proliferation and adoption signify that in many markets, nearly every person has one. Furthermore, their compact form and ease of portability facilitate their usability, wherein by supporting a variety of text and voice communications, a wide and important range of user demands are addressed. Expanding storage capacities further enable users to keep larger volumes of personal data on the phone, such as communication histories (SMS, email, phone calls), calendar data, contacts, and even traditional media like documents, photos and music. In most cases, many files and personal data are locally stored within the resident storage medium in such phones.

To protect owner privacy, various locking mechanisms enables password-locking/unlocking, wherein typically none or all of a mobile unit's features are accessible to the owner or a user thereof. Since typing a password every time a user picks up the phone is tedious, such security model often fails due to non-use.

Furthermore, such security modes hinder use of phones by non-owner users. In general, there exists a variety of social and pragmatic motivations for phone sharing that traverses across diverse user populations. For example, when the owner of a phone is engaged in other activities such as driving, other passengers are invited to respond to an incoming call. Nonetheless, during such usage, an owner's personal data can be compromised (either intentionally or accidentally), when the non-owner user accesses other applications on the mobile phone and unbeknownst to the phone owner.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation regulates range of access to personal information saved on a shared mobile device (e.g., in real time)—via an access control component. Such access control component can designate granularity for access levels and/or a spectrum of access modes—(as opposed to a binary choice of full access or no access at all). The access control component can further include a profile definition component (which enables defining a profile of non-owner users with corresponding access levels), and a profile selection component (which enables setting of security levels or access modes—such as by swiping an index finger on a touch pad to indicate high trust, or thumb to indicate low trust.) Accordingly, a spectrum of ranges or discrete trust relationships can be supplied to an owner of the mobile unit, to select when sharing the mobile unit with other users (non-owners).

The profile definition component can exploit an owner's circles of trust to designate levels of security. As such, the outer circles can signify less personal familiarity with the user, whereas the inner circles can afford an explicit/implicit trust association based in part on belonging to a particular community. Moreover, by employing an owner's social networks to assist such owner in determining the trustworthiness of non-owner users when using the mobile device, the perceived risks associated with sharing activity can be mitigated. Accordingly, an owner can define multiple circles of trust or communities such as for coworkers, friends, family, club membership, religious group, and/or friends of friends, and the like. As the circles of trust relations extend farther from the user, the trust value can decrease by a predetermined value (e.g., upon reaching a threshold.) Hence, a plurality of usage profiles can be defined for accessing the mobile unit. Such usage profiles can designate type of access to information in the mobile device and associated security. Moreover, each "usage profile" can be defined by a name and a specification of the data and/or applications that are available within such profile. For example, a profile can be based on type of relationship associated between owner of the mobile device and users of the mobile device (e.g., associations/designations such as "family", "friend", "stranger", and the like). In addition, such profiles can further exhibit a hierarchical nature. Other profiles can be based on the types of activities the user of the mobile device is enabled to perform (e.g., an "entertainment" profile can provide access to games, the web browser, and local music on the mobile unit while restricting access to other applications). It is to be appreciated that the above are mere examples, and other non-hierarchial profiles, as well as trust relationships that are not defined linearly are well within the realm of the subject innovation. Moreover, the profile definition component can further define a profile based on a set of applications, such as entertainment mode, browser mode, and the like.

According to a further aspect, access modes can further be designated automatically by the access control component upon detecting that the mobile unit is being used by a non-owner (e.g., automatic detection based on biometrics, contextual data and the like). Moreover, the access control component can further facilitate segregation of personal information from other functionality in an application implemented as part of the mobile device). As such, an owner of the mobile device can share such device while mitigating a concern for exposure of personal information. In a further aspect, the access control component can further include an analysis component that evaluates existence of personal information on applications available on the mobile device, to recommend (e.g., automatically) an access mode or security level.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
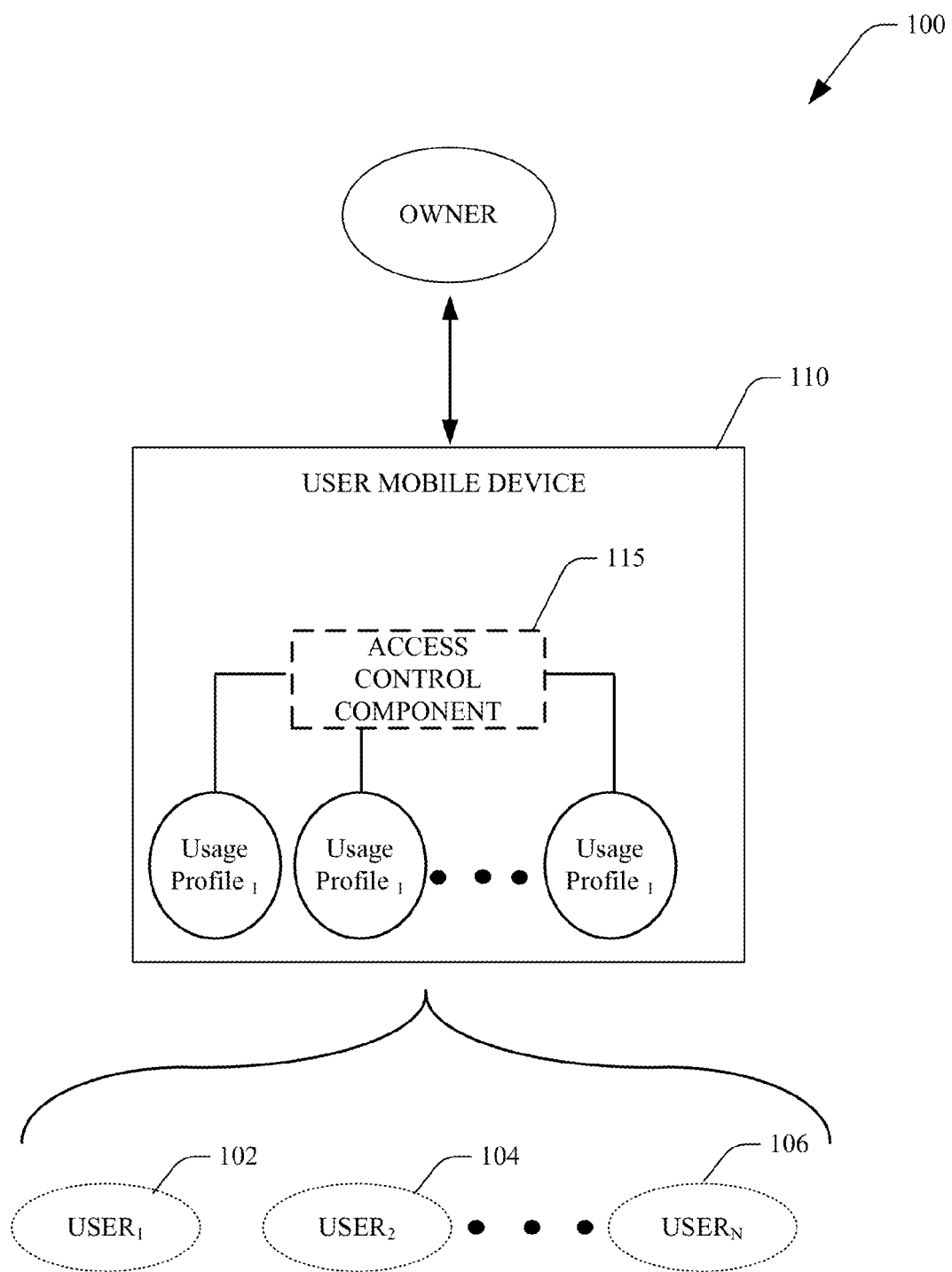
FIG. 1 illustrates a schematic diagram of a system that regulates access to personal information of a mobile device owner, when other non-owner users share such device.

FIG. 1 illustrates a block diagram of a computer implemented system for regulating access to personal data on a mobile unit according to an aspect of the subject innovation. The system 100 regulates range of access to personal information saved on a shared mobile device (e.g., in real time)—via an access control component. Such access control component 115 can designate granularity for security levels and/or a spectrum section of access—(as opposed to a binary choice of full access or no access at all). The personal information can include any type of data generated from employing the mobile device or introduced to the mobile unit by the owner, such as web navigation history, location tracking, calendar events, generated metadata, data records, logs, event data, contact data, data related to owner activities, contextual data, data related to a portion of a transaction, credit information, historic data related to a previous transaction, a portion of data associated with purchasing a good and/or service, a portion of data associated with selling a good and/or service, online activity, previous online transactions, activity across disparate networks, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information obtained from the disparate network, ratings from a website, a credit score, geographical location, a donation to charity, or any other information related to software, applications, web conferencing, and/or any suitable data related to transactions, and the like. Such data can be stored in a plurality of subsets (e.g., partitioned memory locations that store identity credentials), and can be of high value/importance to the owner. As used in this application, the term "owner" is not limited to its definition from a legal aspect and can also refer to the primary user of the mobile unit. For example, a corporation may own legal title to mobile units that are distributed among its employees—and yet the employees actually exert control on such units and store personal information thereon during usage. Accordingly, protecting the privacy of such employees is an object of the subject innovation. Likewise, companies may rent mobile unit to users who primarily use such devices in day-to-day activities, and such users—even though not legally owners of the mobile devices—are intended to be covered by the term "owner" as used in this application.

Figure 2:
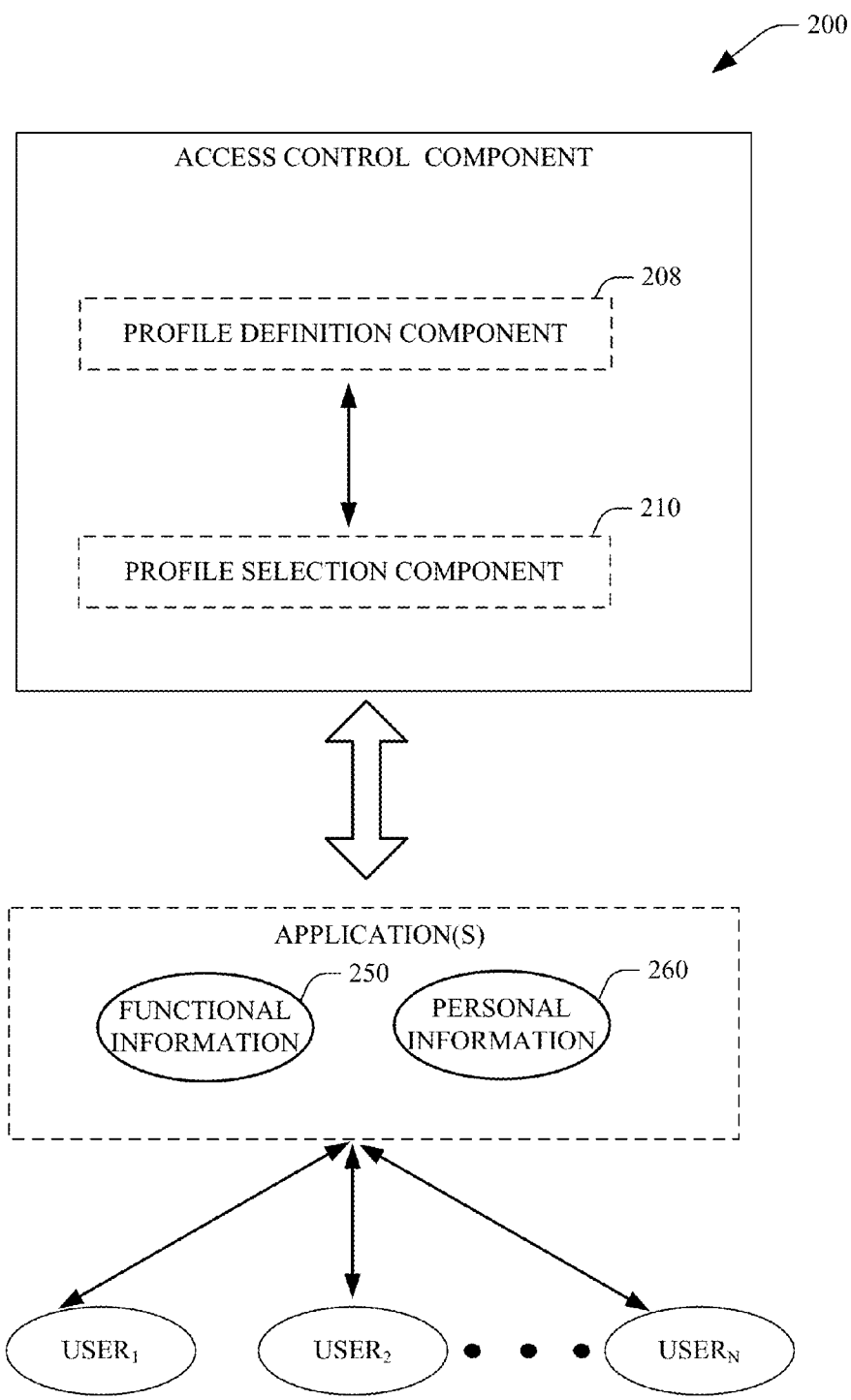
FIG. 2 illustrates a particular aspect of an access control component according to a further aspect of the subject innovation.

FIG. 2 illustrates a further aspect of the subject innovation, wherein the access control component can further include a profile definition component 208 and a profile selection component 210. The profile definition component 208 enables defining a profile of non-owner users with corresponding access levels, and the profile selection component 210 enables setting of security levels or access modes—such as by owner swiping an index finger on a finger print reader to indicate high trust, or thumb to indicate low trust. A spectrum and/or discrete trust relationships can be predetermined or defined or inferred on-the-fly. Thus, once the profile definition component 208 designates an identity/profile for non-owner users, the owner of the mobile unit can access a data store to retrieve the settings associated with such user and automatically configure the mobile unit in accordance with such settings, as described in detail infra. Moreover, the access control component can further facilitate segregation of personal information 260 from other functional aspects 250 in applications implemented as part of the mobile device (e.g., form stateless applications). As such, an owner of the mobile device can share such device with non-owner users for access to functional aspects, while mitigating a concern for exposure of personal information.

It is to be appreciated that the access control component can configure the mobile unit in a variety of formats such as based upon, type of mobile unit, nature of the settings associated with current user, and the like. For example, based on a selection specified by the owner, the profile selection component 210 can apply the settings to the mobile unit based upon whether the mobile is a handheld electronic device, an I/O peripheral, or a controller that controls peripherals or aspects of one or more devices. Accordingly, the access control component can apply settings that affect a physical configuration of the device (e.g., format of data display) as well as a data set employed by the mobile device (e.g., default data storage for the mobile unit).

It is to be further appreciated that the profile selection component can verify an owner's identity via an input component (not shown) that is configured to receive the verifiable identification input of the owner. For example, the input component can be reader, scanner, detector, sensor, or some other suitable component that can obtain a biometric from the owner. Such input component can be specifically tailored for the mobile unit such that a particular type of biometric can be readily obtained. For example, a handheld electronic device can be particularly well suited to readily obtain biometrics related to a user's hands, e.g., fingerprint, hand geometry, grip configuration, and the like—whereas an earpiece can be better suited to obtain a different type of biometric such as a biometric relating to a user's earlobe, for example).

Figure 3:
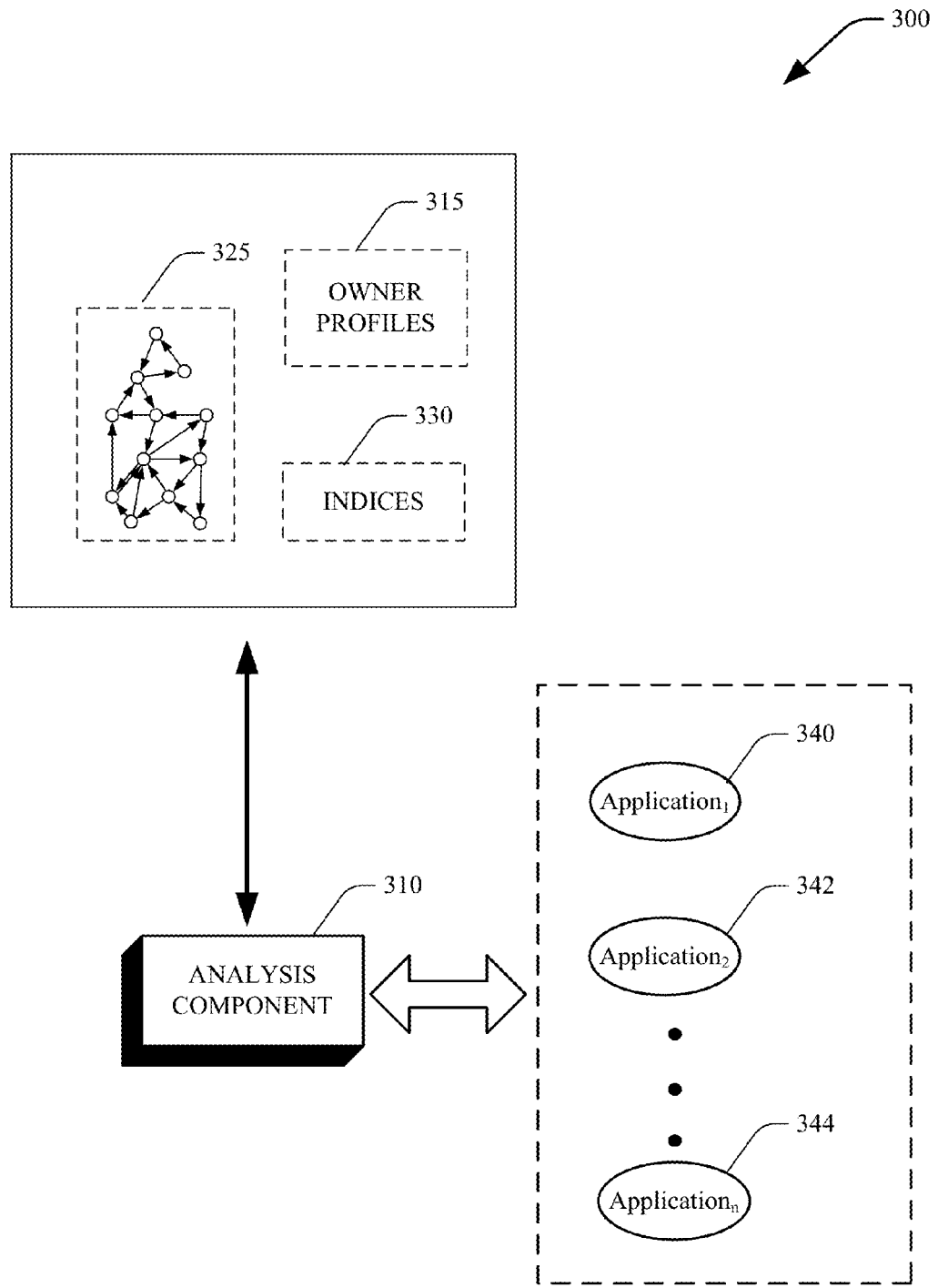
FIG. 3 illustrates a further aspect of an access control component that employs an analysis component according to a further aspect of the subject innovation.

FIG. 3 illustrates a further aspect of an access control component according to an aspect of the subject innovation. Such access control component can additionally include an analysis component 310, which analyzes existence of applications on a mobile unit and their interaction, to suggest a security level or access mode recommendation related to a non-owner user. The computer implemented system can include a storage that stores a variety of data such as for example, owner profiles 315 associated with each application, indices, and a graph 325 that indicates relationships sets, which has been pre-defined for non-owner users who can share the mobile device.

The owner profiles 315 can contain attributes of individuals or entities (e.g., declared trust relationships) associated with the social network of non-owners who can share the mobile device, in accordance with an aspect of the subject innovation. The respective profiles can vary as to quantity as well as quality and type of attribute information, and the trust relationships among user/nodes (e.g., which user/nodes trusts which user nodes). For example, such profile information can be directly supplied for each user or node associated with the social network. It is to be appreciated that any of a variety of information gathering schemes and sub-schemes (e.g., data mining, cookies, data scavenging, $3^{rd}$ party provider, and the like) can also be employed in connection with collection of such attributes for the indices 330 and owner profiles 315.

The graph 325 associated with the social network of a non-owner user can represent a collection of information relating to users (e.g. individuals) and their trust relationships with the owner. Such graph 325 although pictorially depicted as a graph of vertices and arcs can take many data-structure type forms (e.g., table, relational databases, XML based databases, and the like), and functionally represents intra-relationships between subsets of individuals and/or entities within the trust or social network.

The analysis component 310 can supply the owner of the mobile device a recommendation based on the trust relationship indicated by such owner (e.g., which other users/nodes are trusted by this owner), and personal information available to each application or program available on the mobile device. Accordingly, within the graph 325 and the linked structure of nodes, personalized recommendations to an owner can be supplied about non-owner users who intend to share the phone. Such recommendations can be based upon the opinions and reviews of owner about the other users, as well as declared trust between the owner and groups of users, for example. Moreover, the analysis component 310 can analyze each of the applications 340, 342, 344 that are loaded on the mobile unit and evaluate such applications for presence of personal information. The items can be associated with files, such as photographs, word processing files, spreadsheets, and the like, as well as web pages, emails, retail shopping catalogue/products and any other suitable types of items for which personal information about the owner can be generated. Such items can further include items of a substantially similar type or items of disparate types, and can be restricted based upon desired implementation. For example, the items can reside within the mobile unit, be associated with item a hard drive, a removable storage media, an application(s), and the like. Moreover, the items can also be related to the Internet or an intranet and merchandise related therewith. Accordingly, the subject innovation leverages characteristics of an owner, amount of personal data present in an application on the mobile unit, to determine a security level or access mode recommendation for a user based on usage profiles associated with nodes in the trust network around the owner.

Figure 4:
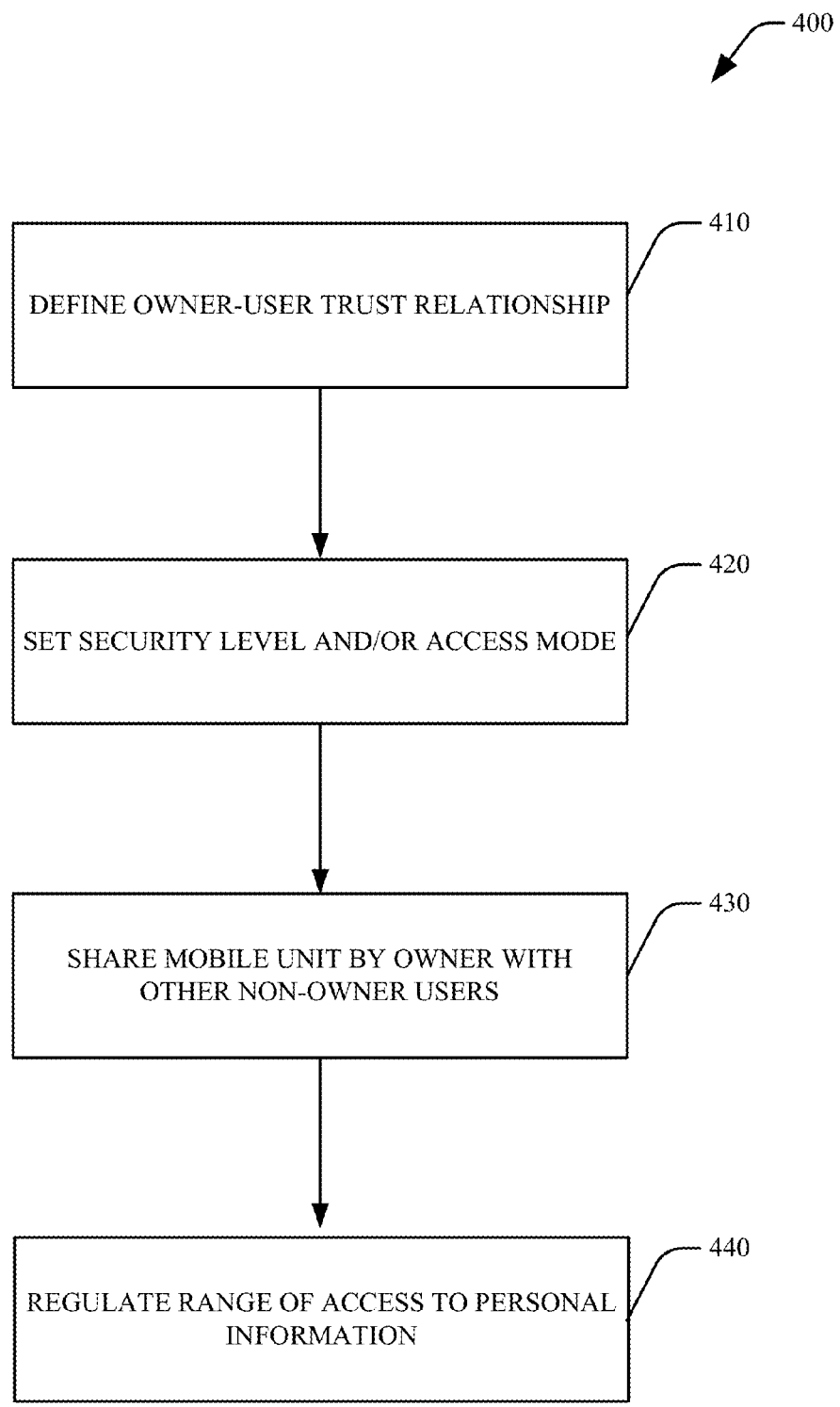
FIG. 4 illustrates a related methodology of regulating range of access to personal information according to an aspect of the subject innovation.

FIG. 4 illustrates an exemplary methodology 400 of regulating access to an owner's personal information according to a further aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410 trust relationships can be defined between an owner of a mobile unit and a user who shares such mobile unit. Hence, a plurality of usage profiles can be defined for accessing the mobile unit. Such usage profiles can designate type of access to information in the mobile device and associated security. Moreover, each "usage profile" can be defined by a name and a specification of the data and/or applications that are available within such profile. Next and at 420, security levels can be set by the owner and/or predetermined access modes granted for such user. Subsequently and at 430, the mobile unit can be shared with other users who do not own the mobile unit. Accordingly, access to personal information of the owner can be regulated at 440. As such, a spectrum of ranges or discrete trust relationships can be supplied to an owner of the mobile unit, to select when sharing the mobile unit with other users (non-owners).

Figure 5:
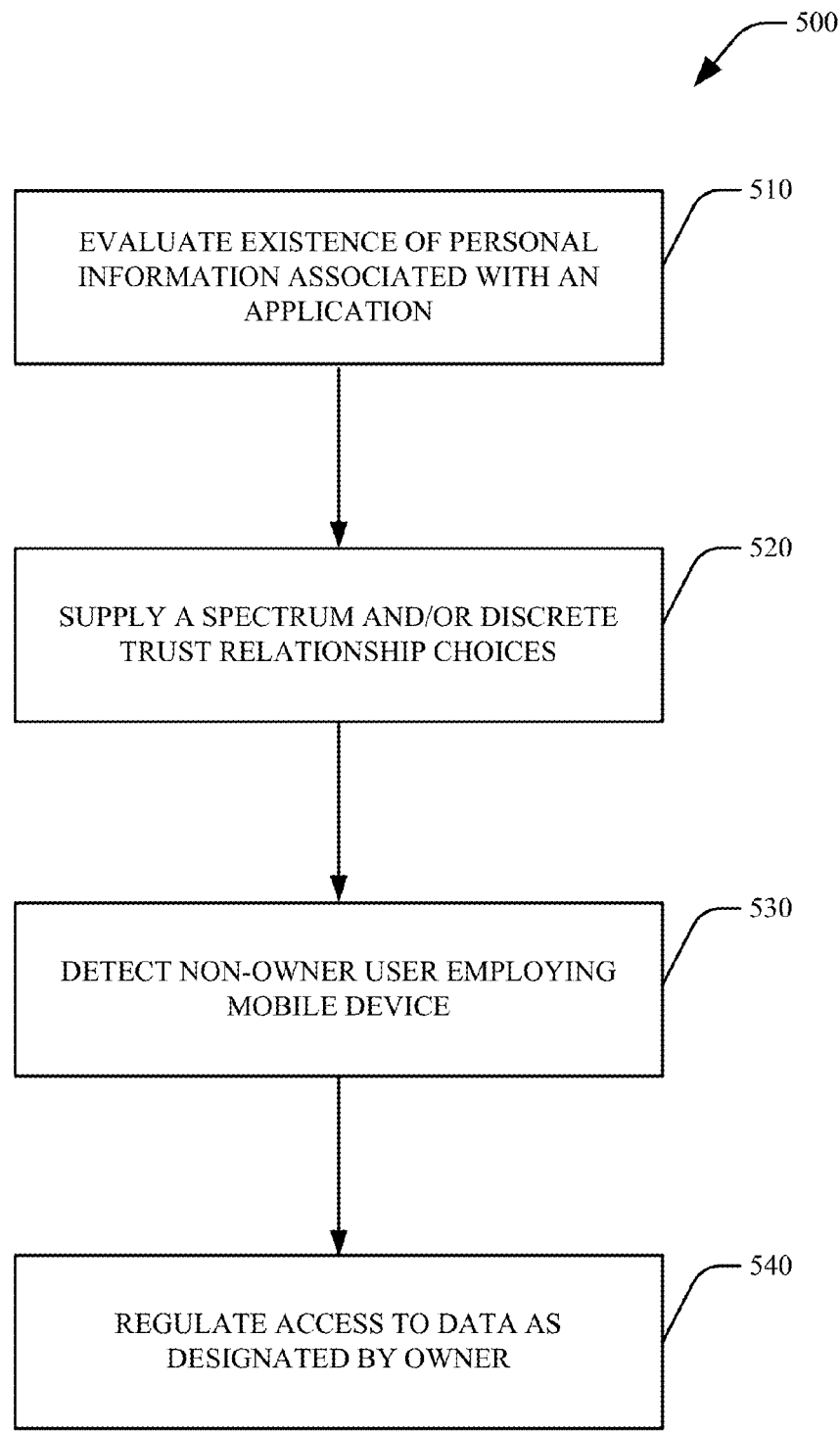
FIG. 5 illustrates a related methodology of blocking access to data as designated by owner of the mobile device according to a particular aspect of the subject innovation.

Likewise, FIG. 5 illustrates a further methodology 500 of qualifying access to functionalities of a mobile unit according to an aspect of the subject innovation. Initially and at 510, existence of personal information associated with an application can be evaluated. The personal information can include any type of data generated from employing the mobile device or introduced to the mobile unit by the owner. Next and at 520, a spectrum of choices and/or discrete relationships can be displayed to a user. For example, one or more context profiles that specify a particular set of user profile variables can be defined that are associated with a general tuning parameter, wherein such tuning value is employed to adjust or "tune" in a relational manner level of trust of the owner for other users. At 530, a non-owner user employing the mobile device can be detected and access to data can be regulated at 540. Hence, the owner can readily adjust or personalize a system in a relative manner without having to understand complex or competing interrelationships between profiles to satisfy specific/personalized trust levels.

Figure 6:
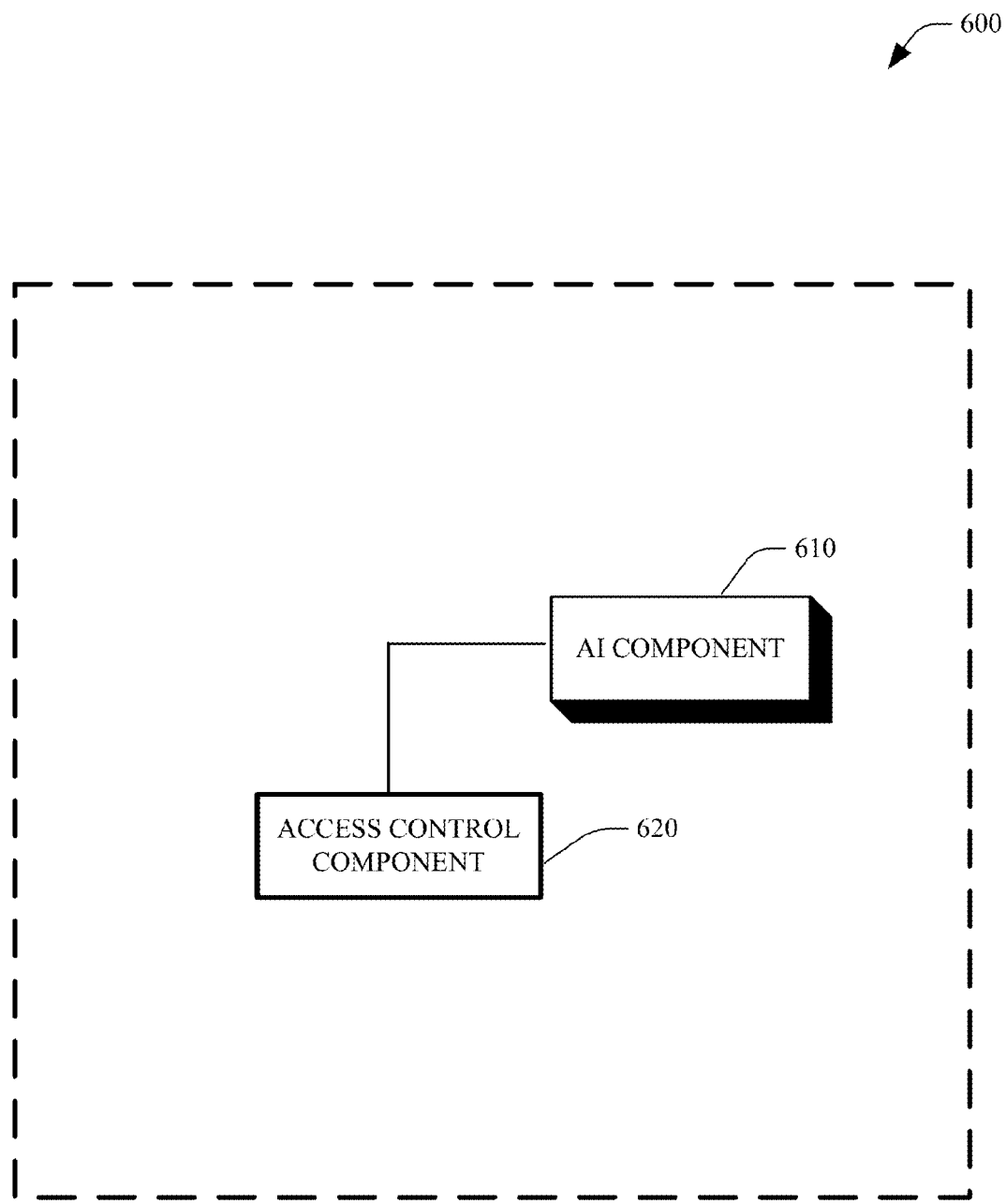
FIG. 6 illustrates a schematic block diagram of an artificial intelligence component that can interact with an access control component according to an aspect of the subject innovation.

FIG. 6 illustrates a further aspect of the subject innovation, wherein the access control component 620 can interact with an artificial intelligence component 610. Such intelligence component 610 facilitates supplying inferences for setting security levels and access modes for non-owner users. It is to be appreciated that the intelligent component 610 can further facilitate reasoning about or inferring states of the system, environment, contextual data and/or user from a set of observations as captured e.g. events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference can result in construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding: a hypersurface in the space of possible inputs, and which hypersurface attempts to split the triggering criteria from the non-triggering events. Intuitively, such can make the classification correct for testing data that is near, but not identical to training data. Other directed and undirected model classification approaches can include: naïve Bayes, Bayesian networks, decision trees, neural networks, fuzzy logic models, and probabilistic classification models providing different patterns of independence, for example. As used herein classification can further include statistical regression that is employed to develop models of priority. Such classification schemes can further be employed by the subject systems and/or methods to facilitate inferring states and/or actions related to personalized content organization, selection, association of personal data with applications on the mobile unit (e.g., navigation history, calendar tasks), and the like.

According to an example, intelligent component 610, in conjunction with processor and memory, can determine presence of personal information for different applications and levels of security to be assigned for non-owner users. Moreover, the intelligent component 610 can supply inferences regarding possible activities of an owner that can signify an upcoming use of the mobile device by another user.

Figure 7:
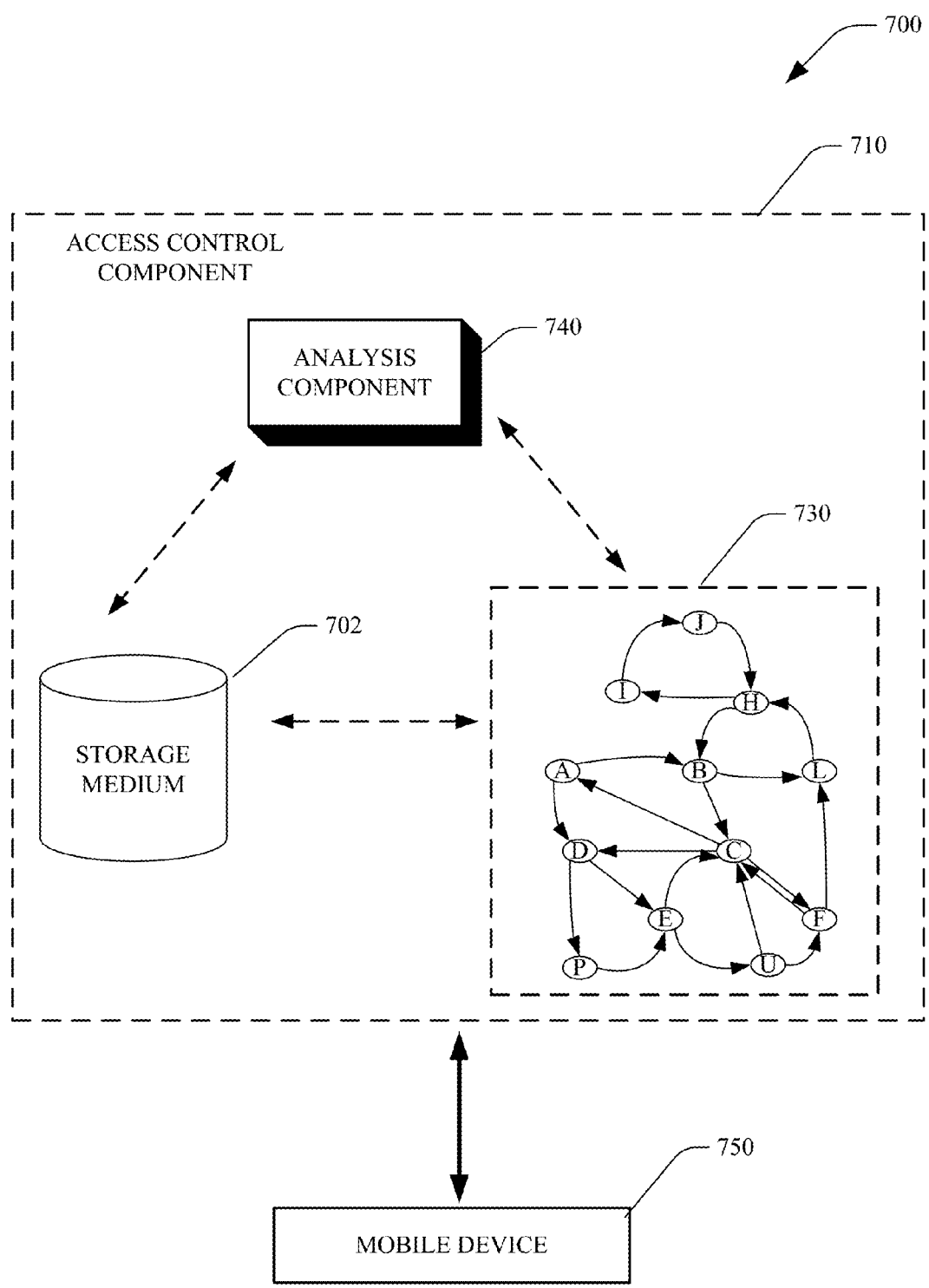
FIG. 7 illustrates an exemplary analysis component as part of an access control component according to an aspect of the subject innovation.

FIG. 7 illustrates a computer-implemented system 700 as part of an access control component 710 of the subject innovation, which regulates range of access to personal information saved on a shared mobile device 750—in real time. The system 700 includes a storage medium 702 that stores mapping information that maps owner declared trust relations for other non-owner users, and existence of personal information for an application, to nodes of a non-owner network who can share the mobile device. For example, the data storage medium 702 can encompass, either volatile memory or non-volatile memory, or can include both volatile and nonvolatile memory. For instance, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. Moreover, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). In addition, it is to be appreciated that such data stores can be associated with a remote: server, database, hard drive, and the like.

The mapping information can be continuously updated and reorganized as links within the system mapping changes (e.g., users changing, new applications are uploaded on the mobile device 750, users added or removed from the network 730, and the like). Graph 730 can represent a network of non-owner users, as well as applications loaded on the mobile device 750, which interact with the analysis component 740. The analysis component 740 can supply for each non owner user a recommendation for access mode or security level, based in part on the trust relationship indicated by the owner (e.g., which other users/nodes are trusted by the owner), and the amount of owner's personal information accessible by each application or program loaded on the mobile device 750.

As explained earlier, in the graph 730 shared users and/or applications loaded on the mobile unit can be represented by vertices (e.g., nodes), and a relationship between two vertices are represented via an arc connecting the vertices. The vertices can be annotated with information (e.g., attributes) about the individual or entity represented by the vertex, in addition to declared trust relationships for other nodes. It is to be appreciated that two or more arcs can be employed with respect to two vertices. More particularly, a unidirectional relationship between a first vertex with respect to a second vertex can be represented by a first arc, and a unidirectional relationship between the second vertex with respect to the first vertex can be represented via a second arc. Moreover, it is to be appreciated that additional arcs could be employed wherein respective arcs can represent unique subsets corresponding to relationships. It is to be appreciated that other aspects of the subject innovation enable owners to manually select profiles for users who intend to share the phone.

Figure 8:
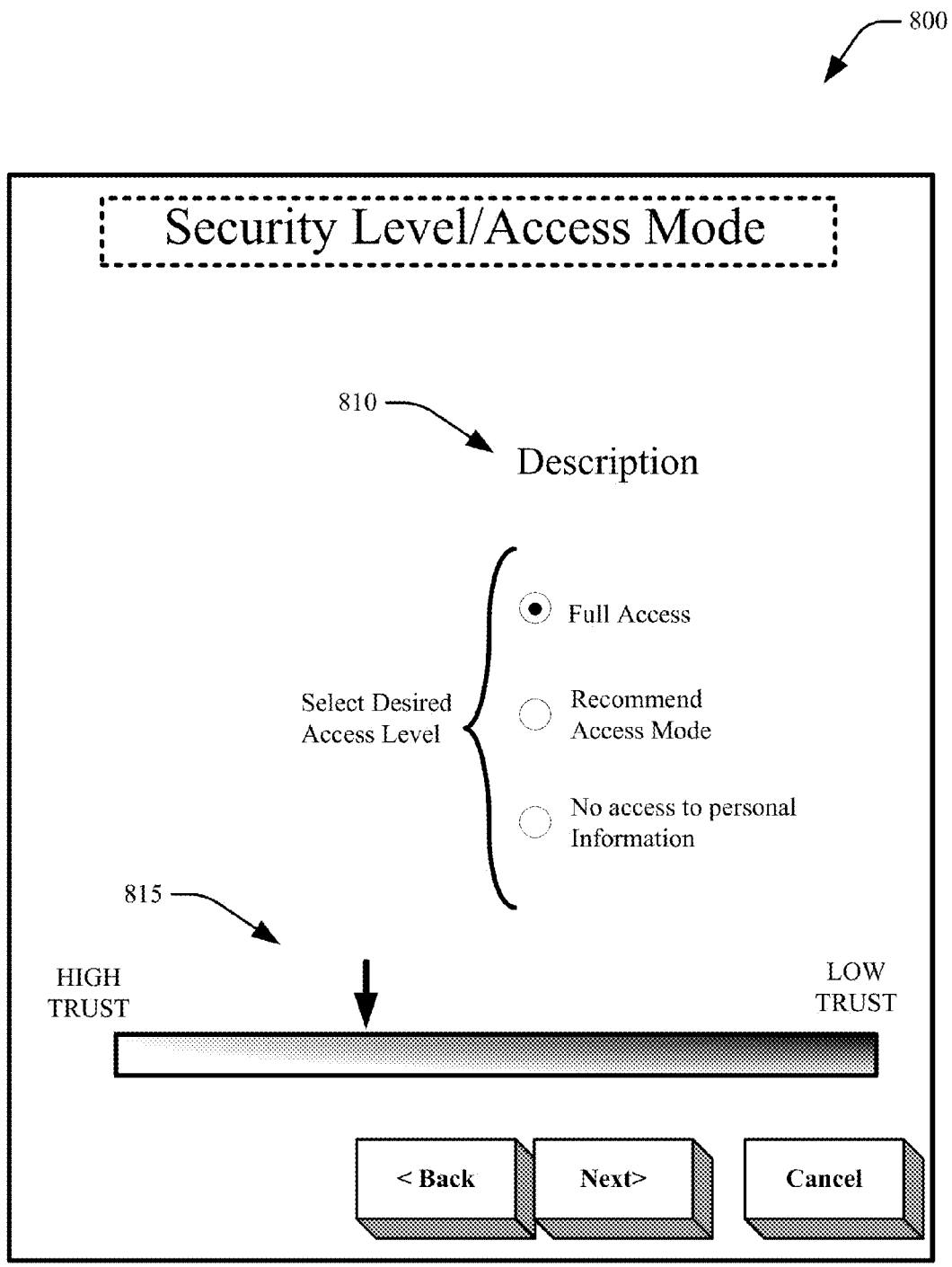
FIG. 8 illustrates a schematic diagram for a user interface for regulating access to contents of a mobile device.

FIG. 8 illustrates a schematic diagram for compartmentalizing contents and applications of a mobile device, via a user interface 800 in accordance with a particular aspect of the subject innovation. Default settings can be provided to facilitate the initial settings and/or one or more personality profiles can be supplied and selected by the owner to enable other users to obtain qualified access to contents and/or applications associated with the mobile unit. As explained earlier, the level of trust can also be set based on a spectrum 815 of how the owner "feels" regarding level of trust. Moreover, one or more context profiles that specify a particular set of user profile variables can be defined that are associated with a general tuning parameter, wherein such tuning value is employed to adjust or "tune" in a relational manner level of trust of the owner for other users. It is to be appreciated that tuning values from one or more context profiles can be combined via a transformation to provide an adjustment that controls the access level granted by the owner. Hence, the owner can readily adjust or personalize a system in a relative manner without having to understand complex or competing interrelationships between profiles to satisfy specific/personalized trust levels. Accordingly, the subject innovation can designate granularity for access levels and/or a spectrum of access modes—as opposed to a mere binary choice of full access or no access at all. Moreover, the user interface 800 enables the owner to specify and adjust one or more of the profile sets and related settings in a user profile. The owner can also specify particular aspects or subsets of the user profiles in which to "tune" or adjust characteristics and performance as pertained to a trust relationship.

Figure 9:
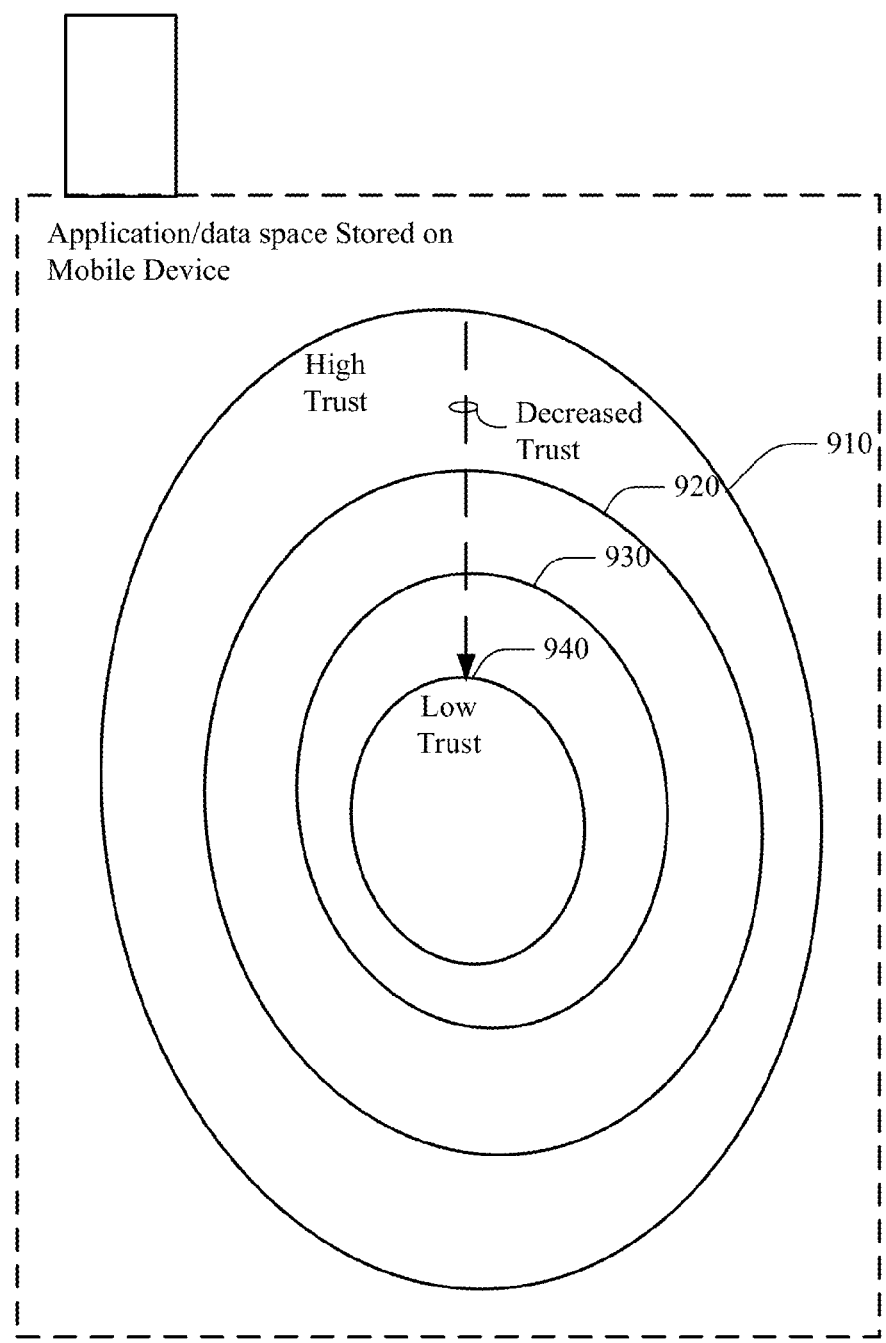
FIG. 9 illustrates a schematic representation for granularity of access levels for various contents stored in a mobile device according to an aspect of the subject innovation.

FIG. 9 illustrates a schematic representation for granularity of access levels to various segments of the mobile device, which stores application/data for the owner. An owner can define multiple zones 910, 920, 930, 940, starting with a broad range of coverage at zone 910 for trusted users, and narrowing down to coverage at zone 940 for users who are less trusted by the owner. Such zones 910, 920, 930, 940 can be carved out based on determinations of trustworthiness, e.g., by employing an owner's social networks to assist such owner in determining the trustworthiness of non-owner users when using the mobile device, the perceived risks associated with sharing activity can be mitigated. Accordingly, an owner can define multiple zones of trust or communities such as for coworkers, friends, family, club membership, religious group, and/or friends of friends, and the like. Accordingly, zones of trust relations extend farther and relationships become less relevant to the user, the trust value can decrease, as illustrated by the shrinking size of coverage. It is to be appreciated that FIG. 9 is exemplary in nature and other configurations such as the zones being independent of each other to cover different applications/data available to non-owner users, are well within the realm of the subject innovation.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
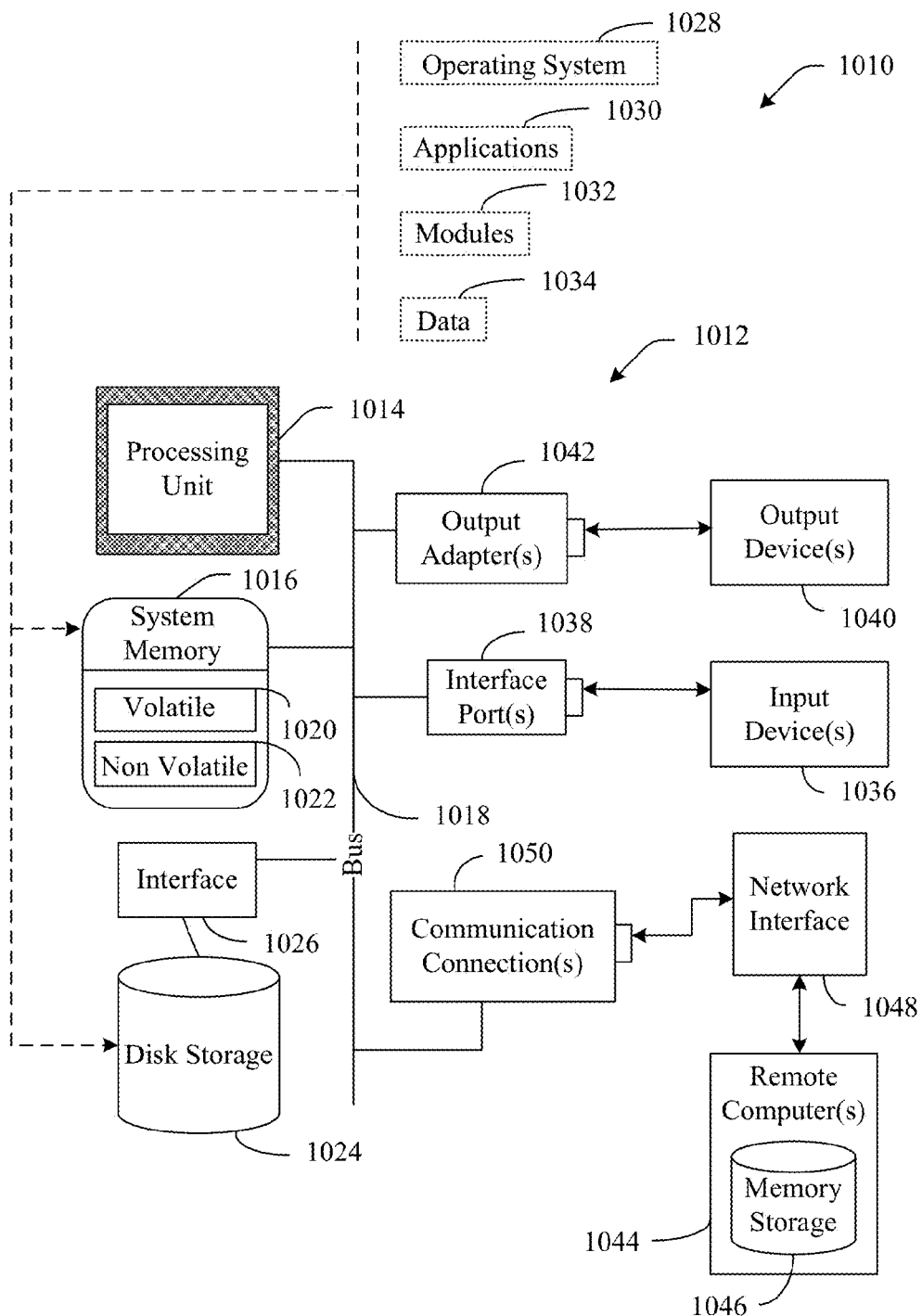
FIG. 10 illustrates a suitable computing environment for implementing various aspect of the subject innovation.
Figure 11:
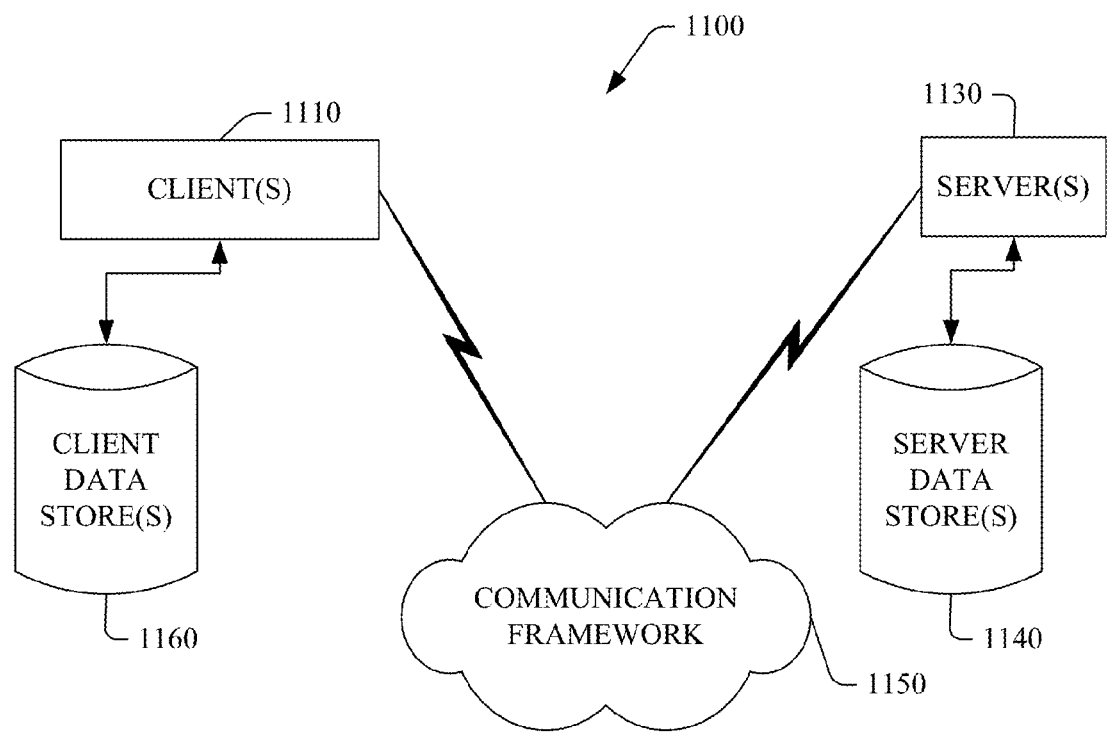
FIG. 11 illustrates a further schematic diagram of a sample-computing environment for the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed in conjunction with an access control component in accordance with an aspect of the subject innovation. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising:
   one or more processors; and
   memory storing computer-executable instructions for execution by the one or more processors, the memory comprising:
      an analysis component to analyze one or more applications stored on a mobile device for presence and an amount of personal information that is accessible by the one or more applications, the personal information associated with an owner of the mobile device;
      a usage profile to designate a range of access for a non-owner user of the mobile device to the personal information; and
      an access control component to regulate the range of access for the non-owner user based at least in part on an access mode automatically designated in response to determining, by the analysis component, the amount of the personal information that is accessible by the one or more applications.

2. The computer implemented system of claim 1, wherein the usage profile is further configured to designate one or more trust relationships between the owner of the mobile device and the non-owner user.

3. The computer implemented system of claim 1, further comprising mapping information to map the presence of the personal information in each of the one or more applications to nodes of a non-owner network of non-owner users who can share the mobile device.

4. The computer implemented system of claim 1, the access control component including a profile selection component to select the usage profile.

5. The computer implemented system of claim 1, further comprising an artificial intelligence component to infer one or more associations between the personal information and the one or more applications on the mobile device.

6. The computer implemented system of claim 1, wherein the analysis component is further configured to recommend the access mode specifying the range of access, wherein the recommendation is based at least in part on the amount of the personal information that is accessible by the one or more applications.

7. The computer implemented system of claim 1, wherein the analysis component is further configured to recommend the access mode specifying the range of access, wherein the recommendation is based on one or more trust relationships indicated by the owner for one or more users other than the non-owner user.

8. The computer implemented system of claim 1, wherein a trust relationship between the owner and the non-owner user is representable as a spectrum of trust levels.

9. The computer implemented system of claim 1, the usage profile further including one or more personality profiles for the non-owner user.

10. A computer implemented method comprising:
    analyzing, by one or more processors, one or more applications stored on a mobile device for existence of personal data accessible by the one or more applications, the personal data stored on the mobile device and associated with an owner of the mobile device;
    defining, by at least one of the one or more processors, a usage profile to designate a range of access for a non-owner user of the mobile device to the personal data;
    automatically designating, by at least one of the one or more processors, an access mode based at least in part on determining an amount of the personal data that is accessible by the one or more applications; and
    regulating, by at least one of the one or more processors, the range of access to the personal data based at least in part on the access mode.

11. The computer implemented method of claim 10, wherein the defining the usage profile is further based on one or more trust relationships between the owner of the mobile device and the non-owner user.

12. The computer implemented method of claim 11, further comprising supplying a spectrum of choices for the one or more trust relationships to the owner.

13. The computer implemented method of claim 10, further comprising granting the access mode to the non-owner user, the access mode specifying the range of access for the non-owner user.

14. The computer implemented method of claim 13, further comprising recommending the access mode based at least in part on the amount of the personal data that is accessible by the one or more applications.

15. The computer implemented method of claim 10, further comprising mapping the existence of the personal data associated with each of the one or more applications to nodes of a non-owner network of non-owner users who can share the mobile device.

16. The computer implemented method of claim 11, further comprising:
    causing display, on the mobile device, of a spectrum for choosing a trust level associated with the non-owner user; and
    adjusting the range of access for the non-owner user based at least in part on user-selection of the trust level.

17. The computer implemented method of claim 10, further comprising recommending the access mode for the non-owner user that specifies the range of access for the non-owner user, the recommending based on one or more trust relationships indicated by the owner for one or more users other than the non-owner user.

18. The computer implemented method of claim 10, further comprising inferring the access mode.

19. The computer implemented method of claim 18, wherein inferring the access mode is based at least in part on a social network of the owner.

20. A tangible computer readable storage device storing instructions that enable actions for controlling access to a mobile device, the actions comprising:

analyzing one or more applications stored on the mobile device for presence of personal information accessible by the one or more applications, the personal information stored on the mobile device and associated with an owner of the mobile device;

automatically designating an access level for a non-owner user of the mobile device based at least in part on determining an amount of the personal information that is accessible by the one or more applications; and regulating a range of access for the non-owner users to the personal information based at least in part on the access level.

\* \* \* \* \*